(12) United States Patent
Speicher et al.

(10) Patent No.: US 8,504,078 B2
(45) Date of Patent: Aug. 6, 2013

(54) METHOD FOR ENSURING THE ACCESSIBILITY OF MOBILE RADIO DEVICES USING AN OPTIMIZED PAGING MECHANISM

(75) Inventors: Sebastian Speicher, Bonn (DE); Karl-Heinz Nenner, Bornheim (DE)

(73) Assignee: T-Mobile International AG, Bonn (DE)

( * ) Notice: Subject to any disclaimer, the term of this patent is extended or adjusted under 35 U.S.C. 154(b) by 413 days.

(21) Appl. No.: 12/597,362

(22) PCT Filed: Apr. 15, 2008

(86) PCT No.: PCT/EP2008/002984
§ 371 (c)(1),
(2), (4) Date: Apr. 23, 2010

(87) PCT Pub. No.: WO2008/128676
PCT Pub. Date: Oct. 30, 2008

(65) Prior Publication Data
US 2010/0210261 A1    Aug. 19, 2010

(30) Foreign Application Priority Data
Apr. 23, 2007 (DE) .......................... 10 2007 019 395

(51) Int. Cl.
*H04W 68/00* (2009.01)
(52) U.S. Cl.
USPC ............ 455/458; 455/426.1; 455/456.1; 455/432.1; 455/436
(58) Field of Classification Search
USPC ............... 455/458, 426.1, 456.1, 432.1, 436
See application file for complete search history.

(56) References Cited

U.S. PATENT DOCUMENTS

| 5,305,371 A | 4/1994 | Saegusa et al. |
| 7,688,786 B2* | 3/2010 | Abrol et al. .................... 370/331 |
| 2001/0029181 A1* | 10/2001 | Verkama ........................ 455/426 |
| 2004/0071112 A1* | 4/2004 | Hsu et al. ........................ 370/331 |
| 2004/0176148 A1* | 9/2004 | Morimoto ...................... 455/574 |
| 2006/0245368 A1* | 11/2006 | Ladden et al. ................. 370/248 |
| 2008/0254814 A1* | 10/2008 | Harris et al. .................. 455/458 |
| 2009/0170527 A1* | 7/2009 | Liu .............................. 455/456.1 |
| 2009/0225664 A1* | 9/2009 | Gazzard ....................... 370/242 |

FOREIGN PATENT DOCUMENTS

| EP | 0533509 A2 | 3/1993 |
| WO | 2007033543 A1 | 3/2007 |

* cited by examiner

*Primary Examiner* — Barry Taylor
(74) *Attorney, Agent, or Firm* — Browdy and Neimark, PLLC

(57) ABSTRACT

The invention relates to a method for performing a paging call in a cellular mobile communications system, wherein a terminal device is operated in a first radio cell of the mobile communications system provided with radio signals from a radio transmission device, said terminal device being in an idle state, and data to be transmitted to the terminal device are present in a data transmission device of the mobile communications system. The invention is characterized in that upon detection of a loss of service or fault in the radio transmission device, measures for handling the loss of service/fault in said radio transmission device are taken, with the goal of restoring the accessibility of the mobile radio device for which said radio transmission device is the last known radio transmission device.

12 Claims, 1 Drawing Sheet

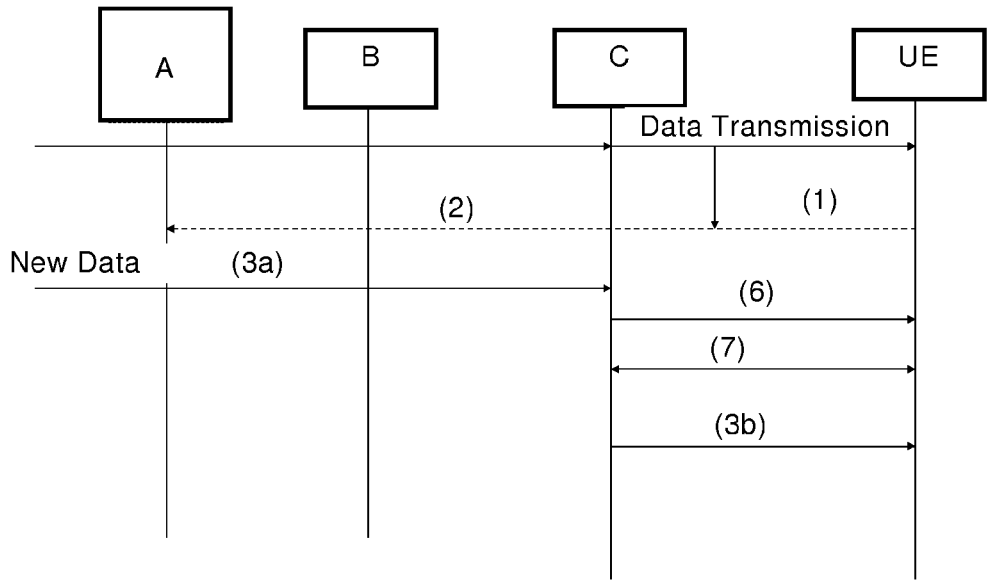
Fig. 1 – Prior Art
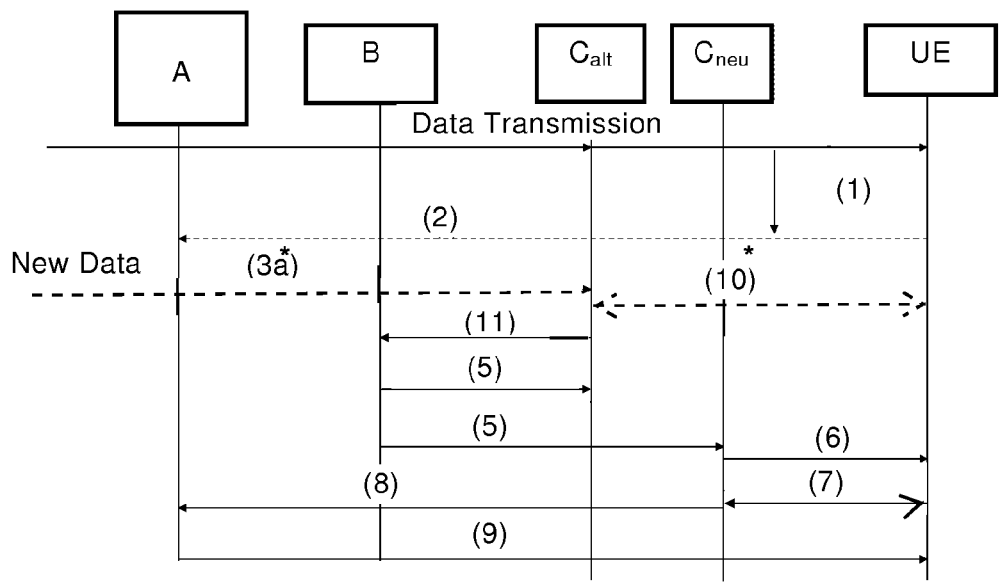
Fig. 2

METHOD FOR ENSURING THE ACCESSIBILITY OF MOBILE RADIO DEVICES USING AN OPTIMIZED PAGING MECHANISM

The invention relates to a method for ensuring the accessibility of mobile radio user equipment (UE) operating in idle mode in the case of a loss of service of the radio transmission device in the service area (cell) of which the UE was last active and switched into idle mode.

PRIOR ART

Starting situation: a mobile radio user equipment device (UE) is located within a radio cell of a mobile radio network and is accessible for data to be transmitted. If no data is transmitted within a certain time period, this data transmission inactivity causes the mobile radio user equipment UE to be put into a so-called idle mode, in which data transmission is no longer immediately possible. In this mode, mobile radio user equipment devices can change their preferred cells without any information to this effect being sent to the mobile radio network.

As soon as data is again ready to be transmitted to the UE, the network must therefore first detect the preferred radio transmission device, the so-called "serving cell" for the particular mobile radio user equipment. This is customarily achieved by means of paging mechanisms. The latter trigger a "radio paging" in all radio transmission devices belonging to a defined area, the so-called "paging area." The mobile radio user equipment addressed in the radio paging message thereupon responds to the radio transmission device in the service area of which it is located. Once the serving cell has been determined by this mechanism, the data to be transmitted can be delivered to the mobile radio user equipment.

In the older, non pre-published application DE 10 2006 006 485 optimized paging mechanisms are disclosed that initially attempt to access the mobile radio user equipment UE only via the radio transmission device in the service area of which the UE switched to idle mode. In the text that follows, this radio transmission device will be referred to as the "last known radio transmission device." If the UE is in fact still located in this area that is supplied with radio signals by the "last known radio transmission device," this avoids an unnecessary radio paging within the remaining paging area, thus resulting in an optimization.

To this effect, as shown in FIG. 1, the last known radio transmission device C is usually stored within a data transmission device A for each mobile radio user equipment device UE (FIG. 1, Steps (1) and (2)). On this basis, data that arrives for UEs is forwarded via a mobility control device B directly to the last known radio transmission device C allocated to the respective UE, (3a). The radio transmission device C initiates a "radio paging," (6). The user equipment UE responds (7). If the UE is in fact still located in the service area of this radio transmission device, the latter delivers the data directly (3b).

If, alternatively, the UE cannot be accessed via the last known radio transmission device by means of a radio paging (FIG. 2), the last known radio transmission device "C" triggers within the mobility control device B a paging within the entire paging area. Once the current serving cell (in FIG. 2 radio transmission device "$C_{neu}$") has been determined by this mechanism, the UE is accessible again and the data to be transmitted can be delivered to the UE.

With this method, the following problem can occur: if a radio transmission device (e.g. radio transmission device C in FIG. 1) experiences a loss of service, all UEs that went into idle mode within the service area of the radio transmission device C, i.e. for which the radio transmission device C is the last known radio transmission device, would no longer be accessible for subsequent data transmissions, even if the UEs were in the meantime located in the service area of a different radio transmission device (that did not experience a loss of service.) This difficulty results from the fact that the data transmission device A continues to forward data for UEs for which the radio transmission device C is the last known radio transmission device, to the radio transmission device C, even if C is experiencing a loss of service.

DISCLOSURE OF THE INVENTION

The invention has as its object to improve the above-described paging method and make it more reliable.

This object is achieved according to the invention by a method for performing a paging in a cellular mobile communication system, wherein a user equipment device (UE) is operated in a first radio cell of the mobile communication system supplied with radio signals by a radio transmission device (C; $C_{alt}$), the user equipment device (UE) being in an idle mode, and data to be transmitted to the user equipment (UE) being present in a data transmission device (A) of the mobile communication system, wherein upon detection of a loss of service or interruption in the radio transmission device ($C_{alt}$), measures for handling the outage/interruption in the radio transmission device ($C_{alt}$) are taken with the goal of restoring the accessibility of the mobile radio user equipment (UE) for which the radio transmission device ($C_{alt}$) is the last known radio transmission device.

Preferred embodiments of the invention and additional advantageous features of the invention are specified in the subclaims.

The inventive solution essentially consists of two steps:
1) Detection of the outage of a radio transmission device
2) Handling the outage of this radio transmission device, with the goal of restoring the accessibility of the mobile radio user equipment devices UEs for which this radio transmission device is the last known radio transmission device.

Preferred embodiments of this inventive solution and details of these process steps will be described in more detail below.

Detecting the outage of the radio transmission device, according to step a) can be achieved in various ways:
1a) by monitoring the connections between the data transmission device(s) A and the radio transmission devices C, and
1b) by monitoring the connections between the mobility control device(s) B and the radio transmission devices C.

Handling the outage of the radio transmission device, according to step B), can comprise the following:

After the outage of a radio transmission device C has been detected, the accessibility of as many UEs as possible for which the radio transmission device C is the last known radio transmission device, can be achieved by means of one of the following variants:

2a) All UEs for which the radio transmission device C is the last known radio transmission device are addressed via all remaining radio transmission devices of the entire paging area by means of a radio paging. A UE that is located in the service area of a different radio transmission device within the paging area and receives the radio paging message responds to this message to the radio transmission device in the service area of which it is located. The radio transmission device thereupon reports the current location to the relevant data transmission device, whereupon the data transmission device uses the new location for the respective UE and is accordingly able to again access the UE.

2b) For each UE for which the radio transmission device C is the last known radio transmission device, a different radio transmission device of the same paging area is allocated within the data transmission device as the last known radio transmission device. The type of allocation of other radio transmission devices may be random or according to a certain pattern (e.g. allocation of the radio transmission devices serving the geographically immediately surrounding areas of the radio transmission device experiencing the outage.)

Once the allocation is complete, it is now ensured that each UE that is not located in the exclusive service area of the radio transmission device experiencing the outage is accessible again. The reason for this is as follows: in the case of the arrival of data for a UE, two cases may occur: either the UE is in fact located in the service area of the last known radio transmission device that has been allocated randomly or according to a certain pattern. In this case, as shown in FIG. 1, the data can be delivered directly. Otherwise (the UE is not located in the service area of the radio transmission device allocated as the last known radio transmission device), a radio paging is triggered within the entire paging area (see above), as shown in FIG. 2. This ensures that all UEs that are not located in the exclusive service area of the radio transmission device experiencing the loss of service are accessible again.

ADDITIONAL EMBODIMENTS OF THE INVENTION

In step 2a) the paging of all UEs of the radio transmission device C experiencing the outage can be achieved in three different ways: (1) directly for all UEs in one contiguous time period, or (2) distributed over a longer time period (e.g. several minutes), or (3) for a certain UE only when data is again ready to be sent for the respective UE.

In case (3) the following must be considered: if the data transmission device and the mobility control device are physically separate it must be made certain that the mobility control device notices the arrival of new data. This can be achieved in various ways: (a) the data transmission device can inform the mobility control device of the arrival of new data, or (b) the mobility control device takes over the data connection(s) of the radio transmission device experiencing the outage until the UE has been located.

In step 2a, the UEs that were in idle mode prior to the outage can be put back in idle mode after the paging of all UEs of the radio transmission device C experiencing the outage.

While step 2 ("handling of the outage of the radio transmission device . . . ") is being carried out, data for the individual UEs can be buffered until these UEs have been located, such that the loss of data due to the outage of the radio transmission device is minimized.

The invention will be explained in more detail below with the aid of drawings. Additional features and advantages of the invention will become apparent in the process.

FIG. 1 schematically shows the signaling in a paging method using a last known radio transmission device.

FIG. 2 schematically shows the signaling according to an inventive paging method.

FIG. 1 has already been discussed in the introductory part of the description.

FIG. 2 shows the inventive optimized solution for the case that the last known radio transmission device $C_{alt}$ is experiencing a loss of service or interruption.

After the outage of a radio transmission device C has been detected, be it by means of monitoring the connections between the data transmission device(s) A and the radio transmission devices C, or by means of monitoring the connections between the mobility control device(s) B and the radio transmission devices C, the accessibility of as many UEs as possible for which the radio transmission device C is the last known radio transmission device can be restored.

The data transmission device A attempts to send new incoming data for the UE via the last known radio transmission device Calt to the user equipment UE. The last known radio transmission device Calt is experiencing a loss of service, and the attempt to make contact accordingly fails, (3a*). Because of the outage of the radio transmission device Calt, an "area paging request" is now triggered in the paging area to all radio cells belonging to a paging area, (11). The mobility control device B sends a paging message "cell paging request" to all radio transmission devices (5)—e.g. $C_{neu}$—belonging to the paging area. The radio transmission devices, e.g. Cneu, initiate a "radio paging" that can be received by all user equipment devices UE located within the respective ranges thereof (6). The user equipment UE addressed in the "radio paging" that is located in the service area of the "new" radio transmission device Cneu announces itself to the "new" radio transmission device Cneu that currently represents the "serving cell". A radio resource allocation to the user equipment device takes place (7), during which process the radio transmission device Cneu informs the data transmission device A of the location of the user equipment device UE, (8). New data can now be transmitted from the data transmission device A via the "new" radio transmission device to the user equipment UE, (9).

Alternatively, it is possible to allocate for each UE for which the radio transmission device $C_{alt}$ is the last known radio transmission device a different radio transmission device $C_{neu}$ as the last known radio transmission device, in the same paging area. The type of allocation of other radio transmission devices—e.g. $C_{neu}$—can be performed randomly or also according to a certain pattern (e.g. allocation of the radio transmission devices that serve the areas geographically immediately surrounding the radio transmission device experiencing the outage.) Once the allocation of the new radio transmission device $C_{neu}$ is complete, it is now ensured that each UE that is not located in the exclusive service area of the radio transmission device $C_{alt}$ experiencing the outage is accessible again. The reason for this is as follows: in a case of the arrival of data for a UE, two cases may occur: either the UE is in fact located in the service area of the last known radio transmission device $C_{neu}$ that has been allocated randomly or according to a certain pattern. In this case, as shown in FIG. 1, the data can be delivered directly. Otherwise (the UE is not located in the service area of the radio transmission device $C_{neu}$ allocated as the last known radio transmission device), a radio paging is triggered in the entire paging area (see above), as shown in FIG. 2. This ensures that all UEs that are not located in the exclusive service area of the radio transmission device experiencing the loss of service are accessible again.

A data transmission device
B mobility control device
C radio transmission device
$C_{alt}$ last used last known radio transmission device
$C_{neu}$ newly allocated radio transmission device (in the case of a loss of service/interruption in $C_{alt}$)
UE user equipment
  Process steps shown in the drawings
(1) user equipment (UE) goes into idle mode
(2) signaling of the idle mode to the network components C, B, A
(3a*) transmitting of new data for UE directly to C (3b) transmitting of new data from C to UE
(4) paging request in the paging area from A to B by means of paging message: "area paging request"
(5) paging request from B to one or more C in the radio cells of the paging area by means of paging message: "cell paging request"
(6) radio paging from C to UE by means of paging message: "radio paging"
(7) radio resource allocation C<->UE by means of a "resource assignment" procedure
(8) transmission of the location of UE from C to B and A by means of paging message: "cell paging response"
(9) transmission of the new data from A to UE
(10*) initiation of paging of the UE by $C_{alt}$ failed
(11) paging request in the paging area from $C_{alt}$ to B by means of paging message: "area paging request"

What is claimed is:

1. A method for performing a paging in a cellular mobile communication system, wherein user equipment devices are operated in a first radio cell of the mobile communication system supplied with radio signals by a radio transmission device (C; $C_{alt}$), said user equipment devices being in an idle mode, and data to be transmitted to the user equipment devices being present in a data transmission device of the mobile communication system, comprising:
    detecting an outage of the radio transmission device ($C_{alt}$), the detection of the outage of the radio transmission device ($C_{alt}$) being determined by monitoring the connections between at least one of the data transmission device (A) and the radio transmission device ($C_{alt}$), and the connections between a mobility control device (B) and the radio transmission device ($C_{alt}$),
    taking measures for handling the outage/interruption in the radio transmission device ($C_{alt}$) with a goal of restoring the accessibility of the mobile radio user equipment devices for which said radio transmission device ($C_{alt}$) is a last known radio transmission device,
    wherein the step of taking measures comprises addressing all user equipment devices for which said radio transmission device is the last known radio transmission device by sending a radio page message from all remaining radio transmission devices in an entire paging area.

2. A method according to claim 1, wherein each user equipment device located in the service area of a different radio transmission device ($C_{neu}$) within the paging area receives the radio paging message responds to said radio paging message to the radio transmission device ($C_{neu}$) in the service area of which said user equipment device is located, and
    after the response is sent, the radio transmission device ($C_{neu}$) of the relevant data transmission device reports the current location of the respective user equipment device, whereupon the data transmission device uses the new location for the respective user equipment and can deliver the data.

3. A method according to claim 1, wherein the paging of the user equipment devices of the radio transmission device ($C_{alt}$) experiencing the outage can be achieved in three different ways: (1) directly for all user equipment devices in one contiguous time period, or (2) distributed over a longer time period, or (3) for a certain user equipment device only when data is again ready to be sent for the respective user equipment device.

4. A method according to claim 1, wherein, in case the data transmission device (A) and the mobility control device (B) are physically separate, arrival of new data for the user equipment is detected by the mobility control device in such a way that: (a) the data transmission device (A) can inform the mobility control device (B) of the arrival of new data, or (b) the mobility control device (B) takes over the data connection of the radio transmission device ($C_{alt}$) experiencing the outage until the user equipment (UE) has been located.

5. A method according to claim 1, wherein, after the paging of the user equipment devices of the radio transmission system ($C_{alt}$) experiencing the outage, the user equipment devices that were in idle mode prior to the outage are put back into idle mode.

6. A method according to claim 1, wherein during the handling of the outage of the radio transmission device ($C_{alt}$), data intended for the user equipment devices before the user equipment devices are located is buffered, such that the loss of data due to the outage of the radio transmission device is minimized.

7. A method for performing a paging in a cellular mobile communication system, wherein user equipment devices are operated in a first radio cell of the mobile communication system supplied with radio signals by a radio transmission device (C; $C_{alt}$), said user equipment devices being in an idle mode, and data to be transmitted to the user equipment devices being present in a data transmission device of the mobile communication system, comprising:
    detecting an outage of the radio transmission device ($C_{alt}$), the detection of the outage of the radio transmission device ($C_{alt}$) being determined by monitoring the connections between at least one of the data transmission device (A) and the radio transmission device ($C_{alt}$), and the connections between a mobility control device (B) and the radio transmission device ($C_{alt}$),
    taking measures for handling the outage/interruption in the radio transmission device ($C_{alt}$) with a goal of restoring the accessibility of the mobile radio user equipment devices for which said radio transmission device ($C_{alt}$) is a last known radio transmission device,
    wherein the step of taking measures comprises allocating, within the data transmission device for each user equipment devices for which said radio transmission device is the last known radio transmission device, a different radio transmission device of the same paging area.

8. A method according to claim 7, wherein once the allocation is complete, the method further comprises making any user equipment device that is not located in the service area of the radio transmission device ($C_{alt}$) experiencing the outage accessible again.

9. A method according to claim 7, wherein the paging of the user equipment devices of the radio transmission device ($C_{alt}$) experiencing the outage can be achieved in three different ways: (1) directly for all user equipment devices in one contiguous time period, or (2) distributed over a longer time period, or (3) for a certain user equipment device only when data is again ready to be sent for the respective user equipment device.

10. A method according to claim 7, wherein, in case the data transmission device (A) and the mobility control device (B) are physically separate, arrival of new data for the user equipment is detected by the mobility control device in such a way that: (a) the data transmission device (A) can inform the mobility control device (B) of the arrival of new data, or (b) the mobility control device (B) takes over the data connection of the radio transmission device ($C_{alt}$) experiencing the outage until the user equipment (UE) has been located.

11. A method according to claim 7, wherein, after the paging of the user equipment devices of the radio transmission system ($C_{alt}$) experiencing the outage, the user equipment devices that were in idle mode prior to the outage are put back into idle mode.

12. A method according to claim 7, wherein during the handling of the outage of the radio transmission device ($C_{alt}$), data intended for the user equipment devices before the user equipment devices are located is buffered, such that the loss of data due to the outage of the radio transmission device is minimized.

* * * * *